United States Patent
Xie et al.

(10) Patent No.: US 7,254,165 B2
(45) Date of Patent: Aug. 7, 2007

(54) RE-CONFIGURABLE DECODING IN MODEM RECEIVERS

(75) Inventors: Qian Xie, San Diego, CA (US); Huaiyu Zeng, Red Bank, NJ (US)

(73) Assignee: Intel Corporation, Santa Clara, CA (US)

( * ) Notice: Subject to any disclaimer, the term of this patent is extended or adjusted under 35 U.S.C. 154(b) by 658 days.

(21) Appl. No.: 10/635,525

(22) Filed: Aug. 7, 2003

(65) Prior Publication Data
US 2005/0031025 A1  Feb. 10, 2005

(51) Int. Cl.
*H04B 1/38* (2006.01)
*H04L 5/16* (2006.01)

(52) U.S. Cl. ............ 375/222; 375/219; 375/225; 375/227; 375/316

(58) Field of Classification Search ............ 375/222, 375/219, 316, 225, 227
See application file for complete search history.

(56) References Cited

U.S. PATENT DOCUMENTS

| | | | |
|---|---|---|---|
| 5,802,153 A | 9/1998 | Sridhar | |
| 5,852,630 A * | 12/1998 | Langberg et al. | 375/219 |
| 6,112,266 A | 8/2000 | Yeh | |
| 6,233,250 B1 | 5/2001 | Liu | |
| 6,456,611 B1 * | 9/2002 | Hu et al. | 370/342 |
| 6,647,059 B1 * | 11/2003 | Faruque | 375/222 |
| 6,744,811 B1 * | 6/2004 | Kantschuk | 375/222 |
| 6,862,325 B2 * | 3/2005 | Gay-Bellile et al. | 375/340 |
| 7,076,514 B2 * | 7/2006 | Erdogan et al. | 708/323 |
| 7,096,411 B2 * | 8/2006 | Cherubini et al. | 714/791 |
| 7,099,401 B2 * | 8/2006 | Betts | 375/295 |
| 7,106,760 B1 | 9/2006 | Perumal | |
| 2003/0165120 A1 * | 9/2003 | Uesugi et al. | 370/282 |
| 2005/0031026 A1 | 2/2005 | Zeng | |

* cited by examiner

*Primary Examiner*—Dac Ha
*Assistant Examiner*—Ted M. Wang
(74) *Attorney, Agent, or Firm*—Kenneth J. Cool; Kenneth J. Cool, P.C.

(57) ABSTRACT

Methods and systems provide for operating a modem receiver such as an ADSL modem receiver. As incoming data signals are received, a decoding scheme is selected from a plurality of decoding schemes based on a predetermined downstream data rate. In one approach a soft receiver architecture of an ADSL modem is able to select between relatively complex decoding schemes and relatively simple decoding schemes based on signal-to-noise ratio (SNR).

36 Claims, 8 Drawing Sheets

RE-CONFIGURABLE DECODING IN MODEM RECEIVERS

CROSS-REFERENCE TO RELATED APPLICATIONS

The present application is related to the application entitled "Hybrid Computer Modem" by Tran, Jimmy C. et al., filed on even date herewith.

BACKGROUND

1. Technical Field

Embodiments of the present invention generally relate to modem communications. More particularly, embodiments relate to modem receivers having re-configurable decoding schemes.

2. Discussion

As the content available on the Internet continues to grow and increase in complexity, the desirability of broadband communication becomes increasingly apparent. Asymmetric digital subscriber line (ADSL) modems convert the copper twisted-pair telephone lines in the plain-old telephone system (POTS) into access paths for multimedia and high speed communication, and have rapidly evolved in an effort to meet the need for broadband communications. Conventional ADSL modems have modem receivers that are implemented in hardware such as application-specific integrated circuit (ASIC) technology. While certain approaches to hardware-based modem receivers have been effective in the past, a number of challenges remain.

A particular challenge relates to decoding in the modem receiver. Specifically, traditional hardware-based modem receivers receive an incoming data signal and decode the incoming data signal in accordance with a particular decoding scheme (or algorithm). In general, the more complex the implemented decoding scheme, the more reliable the decoding. Highly reliable decoding translates into higher data rates for a given loop length, where loop length is defined as the distance between the customer premises equipment (CPE) and the central office (CO).

While data rates have continued to increase due to the availability of more and more reliable encoding schemes, there has been a concurrent trend for ADSL services to cover both short-loop/high-data rate and long-loop/low-data rate customers. For example, the same ADSL service may be required to provide Internet access to CPE that is located close to the servicing CO (i.e., high data rate), as well as CPE located far away from the CO (i.e., lower data rate). The conventional hardware-based ADSL approach to implementing the modem receiver may be unable to achieve this goal, however, due to a lack of programmability. Specifically, the lower data rates associated with long-loop architectures may require more complex decoding schemes than the high data rates associated with short-loop architectures. As a result, conventional hardware-based techniques may be unable to support the varying decoding complexity. While certain approaches have been made at implementing modem technology in software, which can be re-configured more easily, operating system (OS) stability has been a cause for concern. As a result, conventional software modems have not proven to be a viable alternative. There is therefore a need for an approach to implementing a modem receiver that is programmable with regard to the encoding scheme used and does not result in OS instability.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
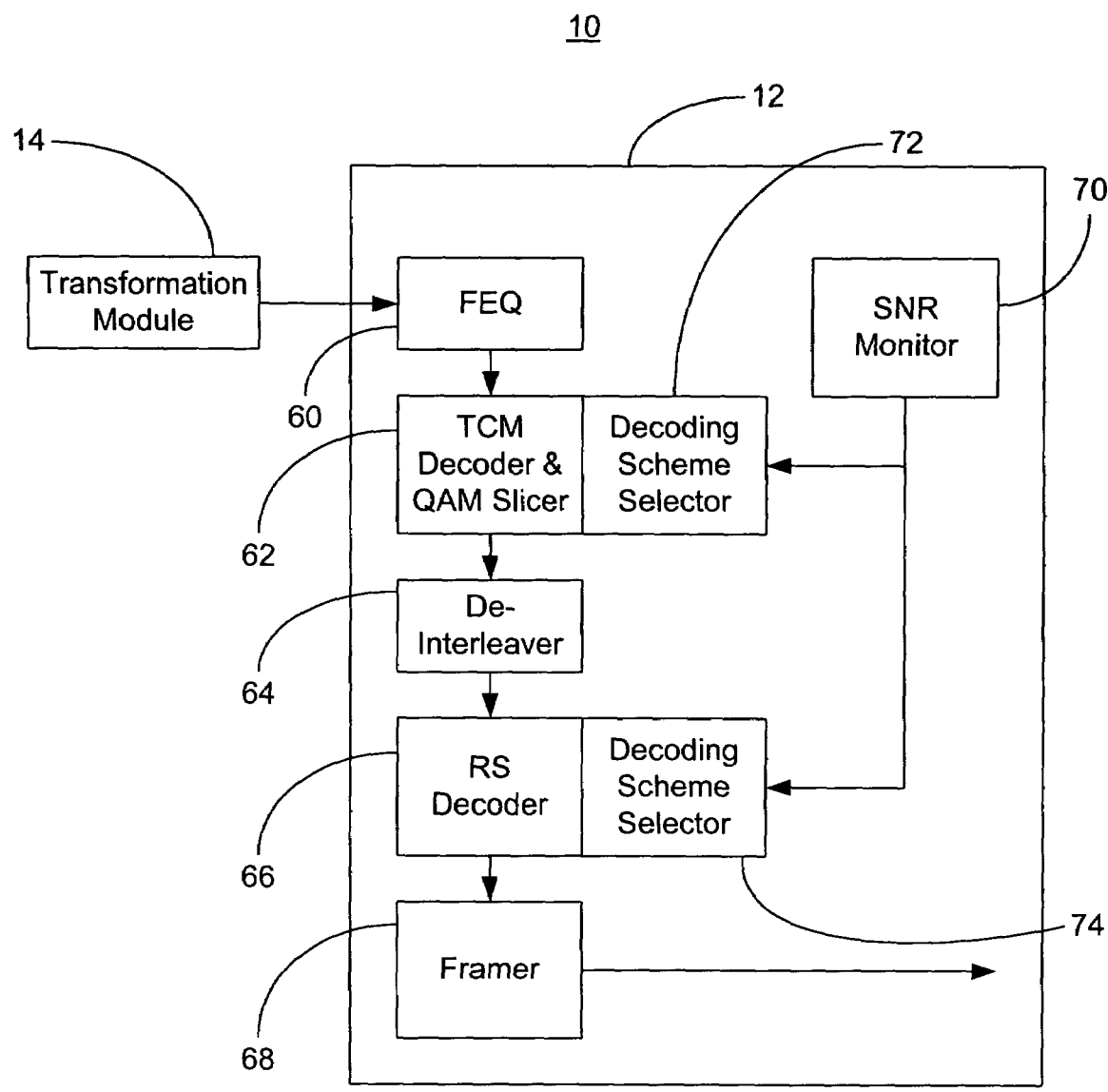
FIG. 1 is a block diagram of an example of a modem system according to one embodiment of the invention.

Embodiments of the present invention provide for an approach to implementing a modem receiver that is highly reconfigurable with regard to decoding. FIG. 1 shows a modem system 10 having a processor 12 that implements a portion of the receive functionality of the modem system 10 in software. Other portions of the receive functionality, such as transformation module 14 are implemented in hardware. Thus, modem system 10 has a "soft receiver" architecture, which can partition the receive functionality between hardware and software based on latency in order to reduce concerns over operating system (OS) instability. While modem system 10 will be primarily described with regard to soft receiver architectures, the embodiments of the invention are not so limited. For example, modem system 10 may readily be implemented entirely in software without parting from the spirit and scope of the principles described herein. Notwithstanding, there are a number of aspects of soft receivers for which the modem system 10 is well suited. It should also be noted that to facilitate discussion, modem system 10 will be primarily described with regard to asymmetric digital subscriber line (ADSL) modem communication, although other types of modems may benefit from the principles described herein.

Generally, transformation module 14, which can be implemented in any appropriate hardware such as application specific integrated circuit (ASIC) technology, transforms an incoming data signal from a time domain to a frequency domain. In one approach, the transformation module 14 is a fast-Fourier transform (FFT) module. Processor 12 is coupled to the transformation module 14 and a machine-readable storage medium (not shown) which includes a stored set of instructions. The processor 12 fetches and executes the instructions to receive the incoming data signal from the transformation module 14 and to select a decoding scheme from a plurality of decoding schemes based on a predetermined downstream data rate for the incoming data signal. By selecting the decoding scheme from a plurality of decoding schemes, the modem system 10 is able to tailor the modem performance to the particular environment.

Figure 2:
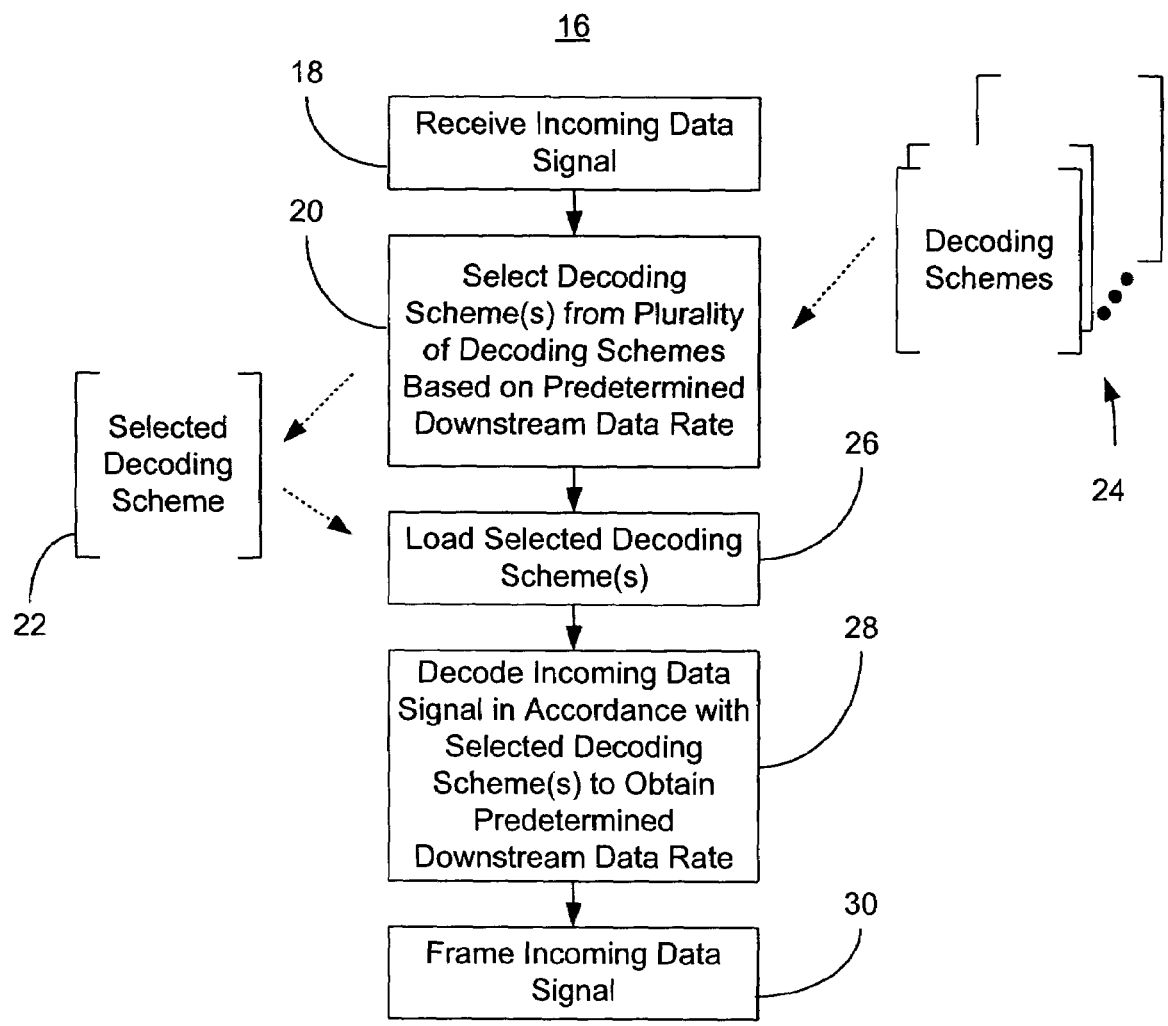
FIG. 2 is a flowchart of an example of a method of operating a modem receiver according to one embodiment of the invention.

Turning now to FIG. 2, a method 16 of operating a modem receiver is shown. Method 16 may be implemented as a set of instructions stored in a machine readable medium such as read-only memory (ROM), random access memory (RAM), compact disk-ROM (CD-ROM), cache memory, etc. to operate a modem receiver. Generally, an incoming data signal is received from a modem component such as a transformation module at processing block 18. Block 20 provides for selecting a decoding scheme 22 from a plurality of decoding schemes 24 based on a predetermined downstream data rate for the incoming data signal.

The selected decoding scheme 22 is loaded at block 26 into a processor memory of the modem receiver. Processor memory may include any suitable storage medium such as a storage register, trace cache, L0 cache, L1 cache, etc. Block 28 provides for decoding the incoming data signal in accordance with the selected decoding scheme 22 to achieve the predetermined downstream data rate. An example of a predetermined downstream data rate might be 400 kilobits per second for a long loop architecture or 13 megabits per second for a short loop architecture. The above examples are provided for discussion purposes only, and the desired downstream data rate can vary depending upon the circumstances. After the decoding, the incoming data signal is framed at block 30 to facilitate processing.

Figure 3:
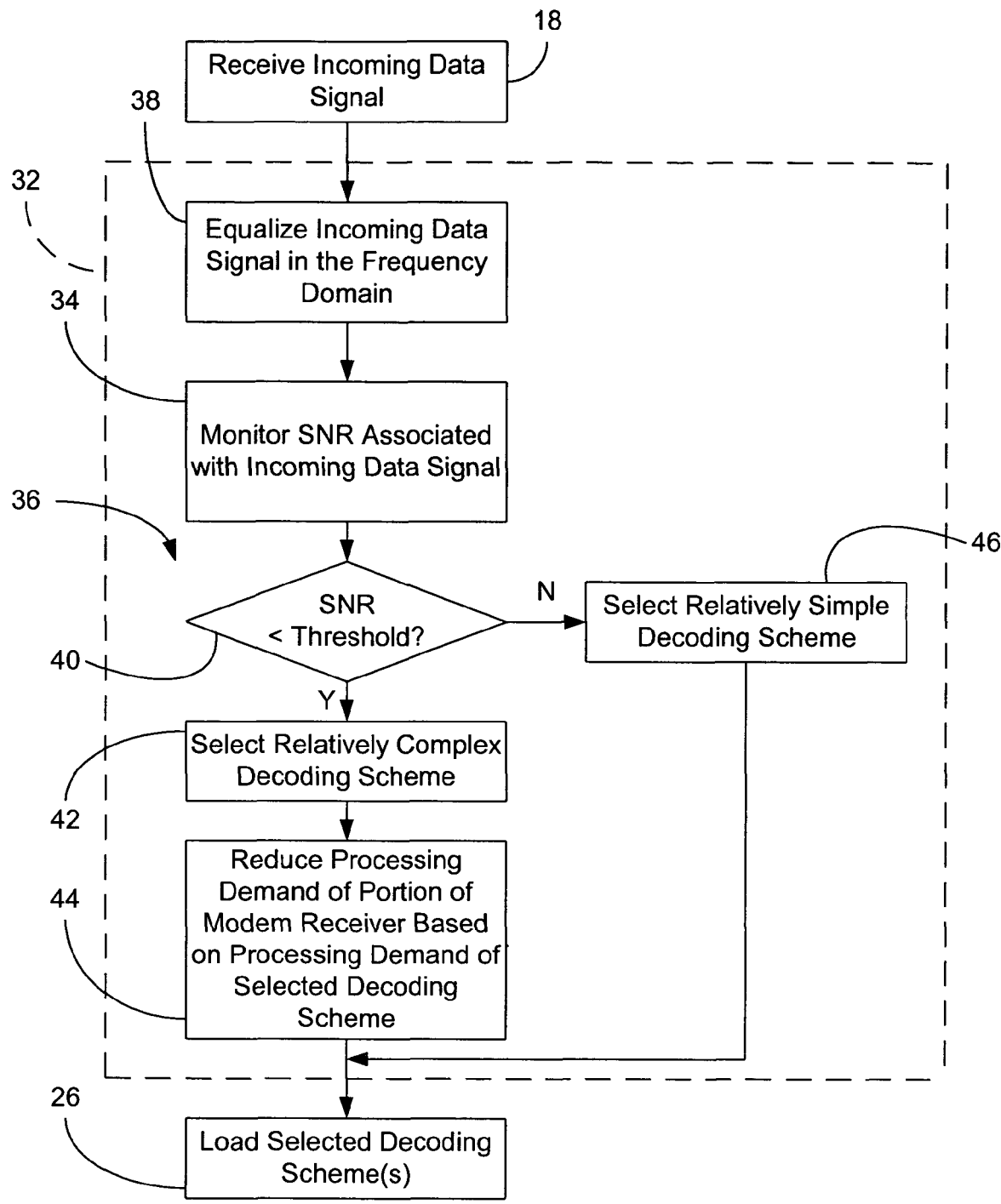
FIG. 3 is a flowchart of an example of a process of selecting a decoding scheme according to one embodiment of the invention.

Turning now to FIG. 3, one approach to selecting a decoding scheme is shown in greater detail at block 32. Generally, a signal-to-noise ratio (SNR) associated with one or more tones of the incoming data signal is monitored at block 34, where blocks 36 provide for selecting the decoding scheme based on the SNR and SNR threshold. The SNR threshold corresponds to the predetermined downstream data rate. It should be noted that the incoming data signal can be equalized in the frequency domain at block 38.

In particular, if it is determined at block 40 that the SNR is less than the SNR threshold, a long loop can be inferred and a relatively complex decoding scheme is selected at block 42 in order to maintain a minimum data rate. Since the relatively complex decoding scheme typically demands more processing resources, block 44 provides for reducing the processing demand of a portion of the modem receiver based on the processing demand of the selected decoding scheme. For example, the modem's bit-loading scheme, which attempts to maximize the raw data rate according to discrete multi-tone (DMT) techniques, can be modified by dropping tones at the frequency edge.

Bit loading and DMT will now be described in greater detail. Another name for DMT is orthogonal frequency division multiplexing (OFDM). There are at most 256 carrier frequencies used in ADSL, that is, $f_n=(n \times 4.3125)$ KHz with n=0,1, . . . 255. A carrier frequency, also called "a tone", may carry a $2^l$QAM constellation, with $1 \leq l \leq 15$.

The number l for each particular tone depends on the SNR in the frequency band where the tone is located. The higher the SNR the greater the number l is. If the SNR is below some threshold, the tone cannot be used at all (i.e., it carries no data). The algorithm that determines l from the SNR is called the "bit-loading" algorithm. Also, a tone can be used for some controlling purposes rather than carrying user data. Therefore, in a practical application the number of tones for carrying user data is less than 256. "Effective tones" mean those tones used for carrying user data.

Each effective tone is loaded with a fraction of a user data package, and the whole set of the effective tones carry the complete package. All the effective tones are transmitted simultaneously and last for roughly 250 µs. These tones are then loaded with the next data package, and keep transmitting for another 250 µs.

The corresponding 250 µs signal interval in the time domain, which is the superimposition of those effective tones, is called a "DMT symbol" or "DMT frame".

When an ADSL modem is connected to the central office (CO) through the telephone line, there are two links of working transmitters-receivers. The first-link includes the transmitter at the CO talking to the receiver at the ADSL modem and the second link includes the transmitter at the modem talking to the receiver at the CO. Usually, the design issues arise for the first link since the downstream (from CO to modem) data rate is much higher than the upstream (from modem to CO) data rate. The first link is therefore taken as an example in the following description.

Activation mode: before user data can be transmitted, certain initialization work should be done at the CPE modem as well as at the CO modem. This initialization is often called "activation". During activation the CO transmitter transmits periodically data packages that are known to the CPE modem receiver as well. In general, these packages are called "training sequences". The DMT symbols carrying those packages typically get distorted and noisy when passing thru the telephone line. When the CPE modem receiver receives the distorted DMT symbols, it computes the noise/distortion level for each effective tone, derives its SNR and finally determines its QAM constellation size (l). The modem sends the l's for all the effective tones, called the "bit-loading table", to the CO so that the CO transmitter can use them in the following data mode.

Data mode: the packages of user data are loaded on the effective tones according to the bit-loading table. During the data mode there may be changes, however, of the SNRs at the tones, and the bit-loading table can be adjusted accordingly at the modem receiver by running the bit-loading algorithm again. The new bit-loading table will be sent to the CO again. In order to monitor the possible SNR changes and also for other purposes, a package of a training sequence can be inserted every 68 user data packages and the DMT symbol carrying this package is called the "synchronization symbol". The modem can re-compute the SNRs at the tones when receiving the synchronization symbol, the same way as it does during the activation mode.

Alternatively, if the SNR of a given tone is higher than the SNR threshold, it can be inferred that a short-loop architecture is being employed and block 46 provides for selecting a relatively simple decoding scheme.

With further regard to the determination at block 40, in one example, in order to let a tone carry the smallest QAM constellation, i.e., l=1, the SNR at the tone should be at least 11.3087 dB. Thus, if the SNR at this tone is below 11.3087 dB, the tone cannot carry any user data. If none of the 256 tones have an SNR above 11.3087 dB, the ADSL modem can not establish a reliable connection with the CO at all.

However, certain more complex decoding algorithms can compensate the SNRs by 0.5-1.5 dB. As a result, a tone with SNR of(11.3087−0.5=10.8087) dB can carry a QAM constellation of l=1.

Therefore, the system switches to a relatively complex decoding algorithm when the SNRs at most of the tones drop to an SNR threshold near 11.3087 dB. This threshold, and the values shown on Table I below are merely examples to facilitate a more complete understanding of the principles described herein. Thus, other SNR thresholds may be readily used without parting from the spirit and scope of the embodiment of the invention.

TABLE I

| l (QAM size in bits) | SNR for BER = 1e−7 (qam_ber_inv. m "theory") Derived | Results from simulation | | | SNR for BER = 1e−7 (interpolated) | SNR gap in dB |
|---|---|---|---|---|---|---|
| | | SNR in dB (BER) | SNR in dB (BER) | SNR in dB (BER) | | |
| 1 | 11.3087 | 10.8086 (4.17e−7) | 11.3087 (1.0287e−7) | 11.6087 (3.106e−8) | 11.32 | 11.32 |
| 2 | 14.319 | 13.819 (4.483e−7) | 14.319 (9.704e−8) | | 14.3147 | 9.5435 |
| 3 | 18.208 | 18.208 (1.377e−6) | 18.708 (3.033e−7) | 19.708 (1.206e−8) | 19.4062 | 10.9552 |
| 4 | 21.218 | 20.718 (6.688e−7) | 21.218 (1.287e−7) | 21.318 (1.112e−7) | 21.3821 | 9.6212 |
| 5 | 24.360 | 23.860 (4.471e−7) | 24.360 (1.025e−7) | 24.510 (5.412e−8) | 24.368 | 9.4544 |
| 6 | 27.371 | 26.871 (6.851e−7) | 27.371 (1.437e−7) | 27.521 (1.063e−7) | 27.5457 | 9.5523 |
| 7 | 30.361 | 29.861 (5.675e−7) | 30.361 (1.240e−7) | 30.511 (7.172e−8) | 30.4301 | 9.3921 |
| 8 | 33.371 | 32.871 (6.968e−7) | 33.371 (1.935e−7) | 33.521 (9.481e−8) | 33.5136 | 9.4482 |
| 9 | 36.332 | 35.832 (6.033e−7) | 36.332 (1.267e−7) | 36.482 (7.359e−8) | 36.4071 | 9.3229 |
| 10 | 39.342 | 38.842 (7.291e−7) | 39.342 (1.763e−7) | 39.492 (1.280e−7) | 39.5788 | 9.480 |
| 11 | 42.300 | 41.800 (5.667e−7) | 42.300 (9.60e−8) | 42.450 (8.558e−8) | 42.2994 | 9.1882 |
| 12 | 45.310 | 44.810 (7.798e−7) | 45.310 (2.053e−7) | 45.460 (1.067e−7) | 45.4704 | 9.3479 |
| 13 | 48.271 | 47.771 (5.811e−7) | 48.271 (1.458e−7) | 48.421 (8.669e−8) | 48.3880 | 9.2546 |
| 14 | 51.282 | 50.782 (8.080e−7) | 51.282 (1.742e−7) | 51.432 (1.158e−7) | 51.4726 | 9.3287 |
| 15 | 54.248 | 53.748 (4.818e−7) | 54.248 (1.682e−7) | 54.398 (9.942e−8) | 54.3970 | 9.2426 |

Figure 4:
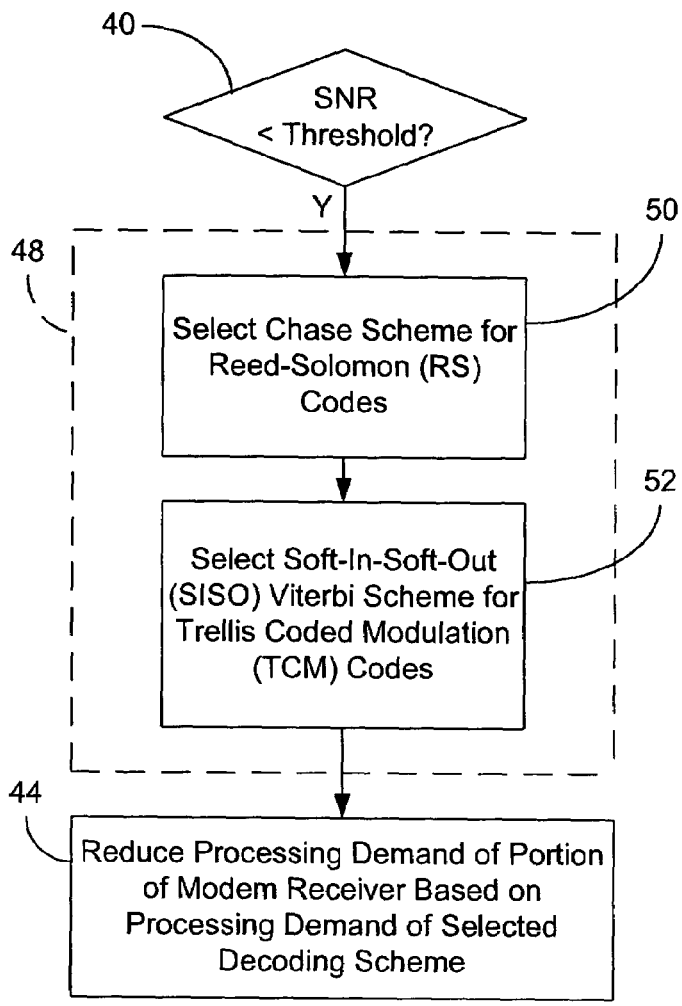
FIG. 4 is a flowchart of an example of a process of selecting relatively complex decoding schemes according to one embodiment of the invention.

FIG. 4 shows one approach to selecting a relatively complex decoding scheme in greater detail at block 48. Block 48 may therefore be substituted for processing block 42 (FIG. 3) discussed above. Specifically, a Chase scheme for Reed-Solomon (RS) codes is selected at block 50 and a soft-in-soft-out (SISO) Viterbi scheme for trellis coded modulation (TCM) codes is selected at block 52.

Figure 6A:
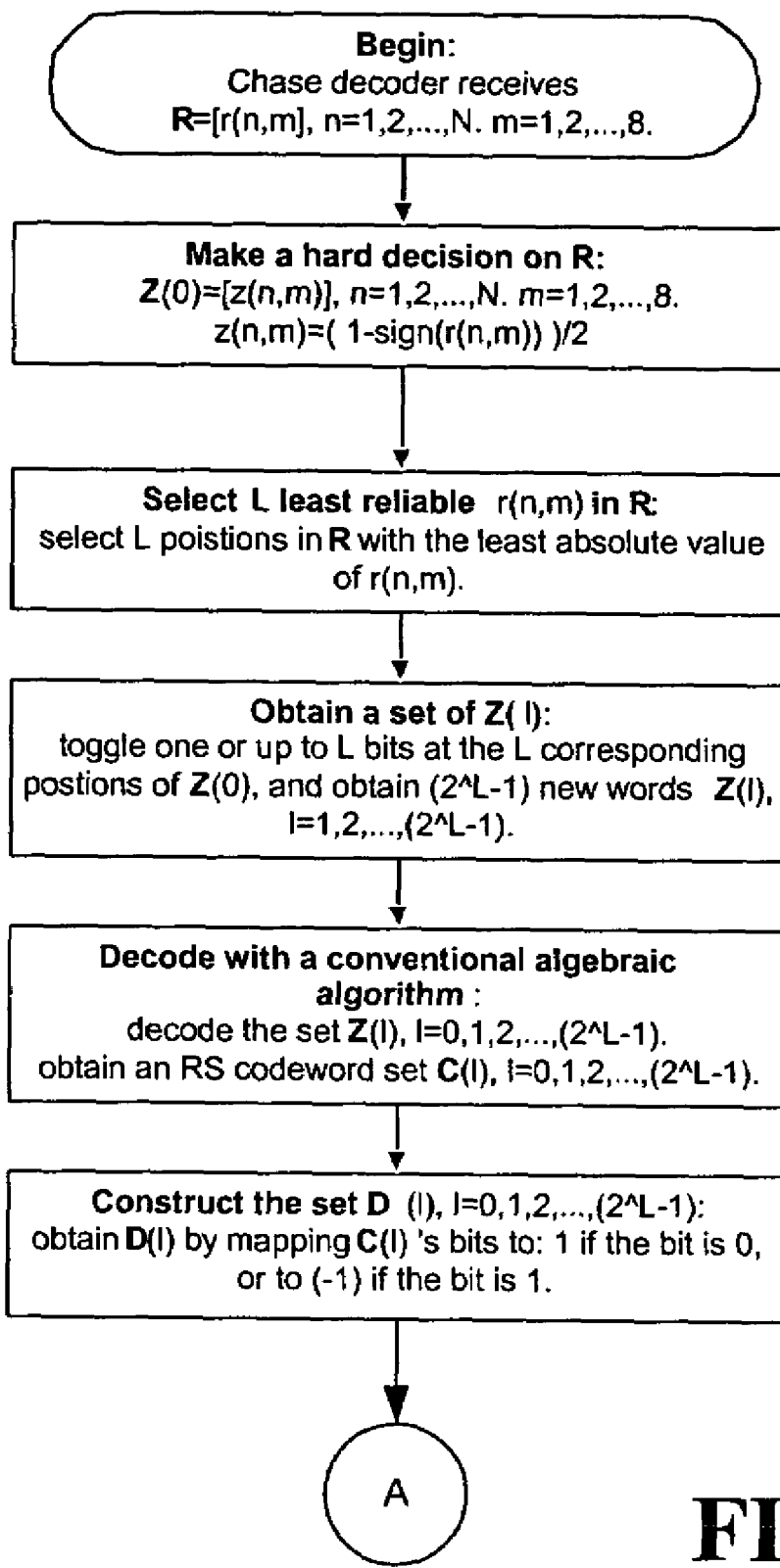
FIGS. 6A and 6B are flowcharts of examples of processes of encoding an incoming data signal according to a relatively complex encoding scheme according to one embodiment of the invention.
Figure 6B:
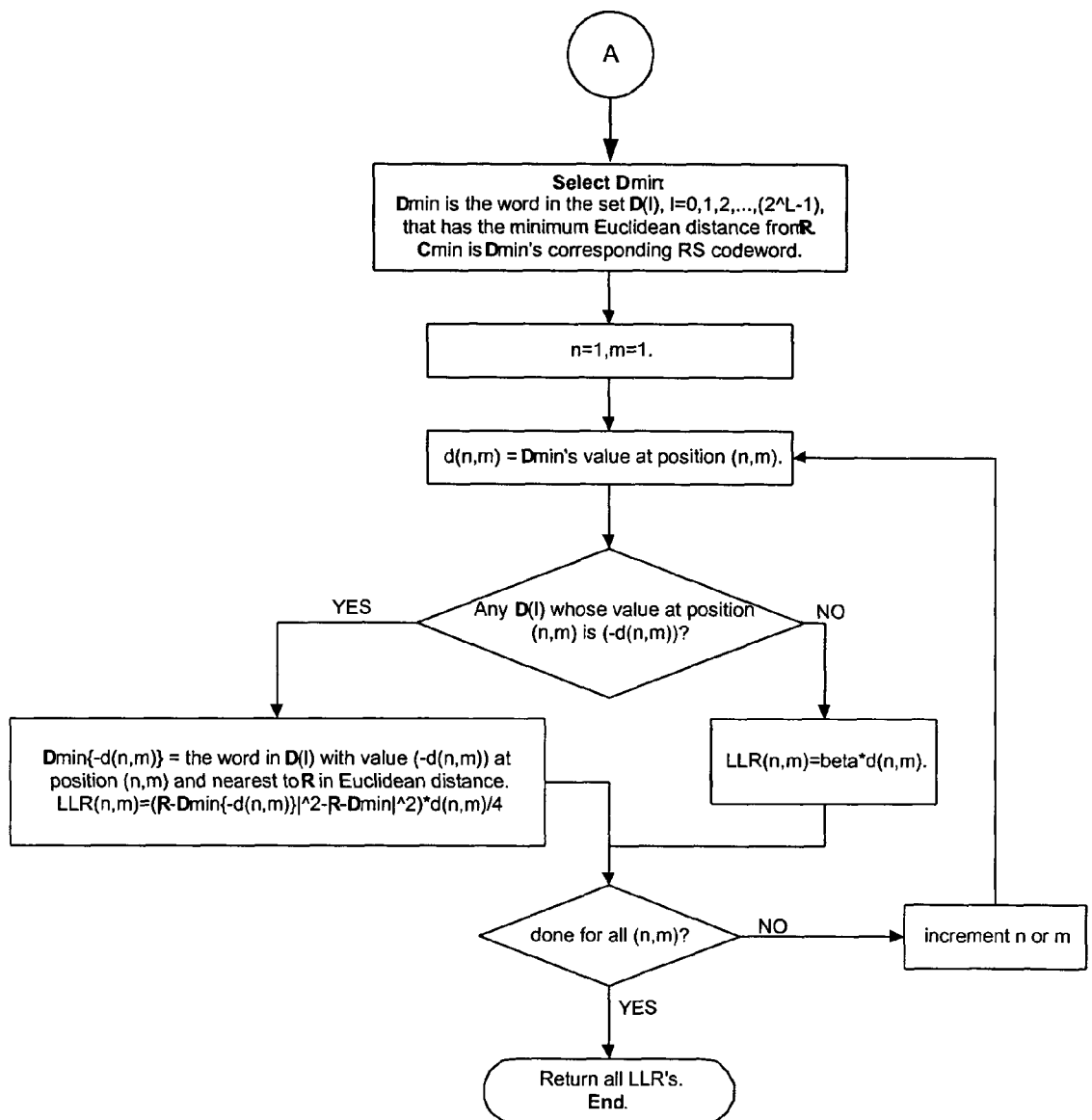

FIGS. 6A and 6B illustrate a Chase scheme for RS codes in greater detail at blocks 54, 55. Specifically, a trellis can be built for a small size linear block code, e.g., an RS code, and then a SISO Viterbi or Bahl, Cocke, Jelineh and Raviv (BCJR) algorithm can be used to deliver soft-decisions. The computation will increase exponentially with the block size. Therefore, the Chase algorithm is preferred as the soft-decision decoder for large size linear block codes. The processing demand required for Chase algorithm may be ten times to hundreds times that of a conventional algebraic decoder, depending on the performance-computation trade-off.

The following is a brief description of Chase algorithm. It is assumed that the RS code is defined on the Galois Field $GF(2^8=256)$ and so each $GF(2^8)$ symbol is denoted by a byte. Let (N, K, T) be the size of the RS code, where the codeword length is N bytes, the information is K bytes and up to T byte-errors can be corrected. Let each bit of a byte be mapped to "1" if the bit is 0, and be mapped to "−1" if the bit is 1.

$U=[u_1,u_2,\ldots,u_N]$—an RS codeword whose length is N bytes, i.e., it contains K bytes information and (N-K) bytes parity check. Note that each byte $u_n$ contains eight bits, $u_n=[u_n^1,u_n^2,\ldots,u_n^8]$, where $u_n^m$ is either 0 or 1.

$X=[x_1,x_2,\ldots,x_N]$—each $x_n$ contains eight elements, $x_n=[x_n^1,x_n^2,\ldots,x_n^8]$, with each $x_n^m$ mapped from $u_n^m$ as $(x_n^m=1-2u_n^m)$.

$R=[r_1,r_2,\ldots,r_N]$ with $r_n=[r_n^1,r_n^2,\ldots,r_n^8]$—this vector could be the output of one of the following two devices. (1) a soft-decision demodulator. In this case, it is often assumed that $(r_n^m=x_n^m+\eta_n^m)$, where $\eta_n^m$ is AWGN (additive white Gaussian noise). (2) a soft-output FEC (forward error-control codes) decoder, e.g., an SISO Viterbi decoder (discussed below), given an observation y at its input. The output could be scaled by a factor or normalized in some way. But without the loss of generality, let $r_n^m$ be the log likelihood ratio, $$LLR(u_n^m|y) = \log\frac{p(u_n^m = 0|y)}{p(u_n^m = 1|y)},$$

that the previous soft-output device delivers.

$Z^0=[z_1,z_2,\ldots,z_N]$ with $z_n=[z_n^1,z_n^2,\ldots,z_n^8]$—a binary hard decision on R by $$z_n^m = \frac{1-\text{sign}(r_n^m)}{2}.$$

$C^0=[c_1,c_2,\ldots,c_N]$ with $c_n=[c_n^1,c_n^2,\ldots,c_n^8]$—an RS codeword that a conventional algebraic RS decoder, e.g., an Berlekamp Massey decoder, delivers based on the binary input $Z^0$.

The Chase algorithm:
1. Select L least reliable elements of R, i.e., those $r_n^m$ with the least values of $|r_n^m|$, and by toggling (from 0 to 1 or from 1 to 0) one or more bits of those corresponding $z_n^m$'s in $Z^0$, $(2^L-1)$ new words $Z^l, l=1,2,\ldots,(2^L-1)$ are obtained. The choice of L depends on the trade-off between performance and computational complexity.
2. A conventional algebraic RS decoder will deliver the new $(2^L-1)$ RS codewords $C^l, l=1,2,\ldots,(2^L-1)$, corresponding to $Z^l$
3. Obtain $D^l, l=0,2,\ldots,(2^L-1)$ by mapping $C^l, l=0,2,\ldots,(2^L-1)$'s zero-bits to 1's and nonzero-bits to $(-1)$'s.
4. Let $D_{min}$ be the word that has the minimum Euclidean distance from R among all $D^l$, $l=0,2,\ldots,(2^L-1)$, and let $C_{min}$ be its corresponding RS codeword.
5. The log likelihood ratio of the decision on $u_n^m$ is approximated as the following. Let $c_n^m$ be the binary value of $C_{min}$ at the corresponding position, and $d_n^m$ be the value of $D_{min}$. Let $D_{min}\{-d_n^m\}$, if it can be found in the set of $D^l$, be the word that has the minimum Euclidean distance from R but with value $(-d_n^m)$ at the corresponding position. Then $$LLR(\hat{u}_n^m) = \log\frac{p(u_n^m=0|R)}{p(u_n^m=1|R)} \approx \left(\frac{|R-D_{min}\{-d_n^m\}|^2 - |R-D_{min}|^2}{2\sigma^2}\right) \cdot d_n^m,$$

where $|R-D|^2$ denotes the squared Euclidean distance.

If $D_{min}\{-d_n^m\}$ cannot be found in the set, then let LLR $(\hat{u}_n^m)=\beta \cdot d_n^m$, where $\beta$ is a constant. The selection of $\sigma^2$ and $\beta$ depends on the SNR at the RS decoder's input. A reference is $\sigma^2=2, \beta=0.4$.

The soft output $LLR(\hat{u}_n^m)$ can be used as the input of the next FEC decoder, or be used for the next iteration of a Turbo FEC decoder.

Figure 7A:
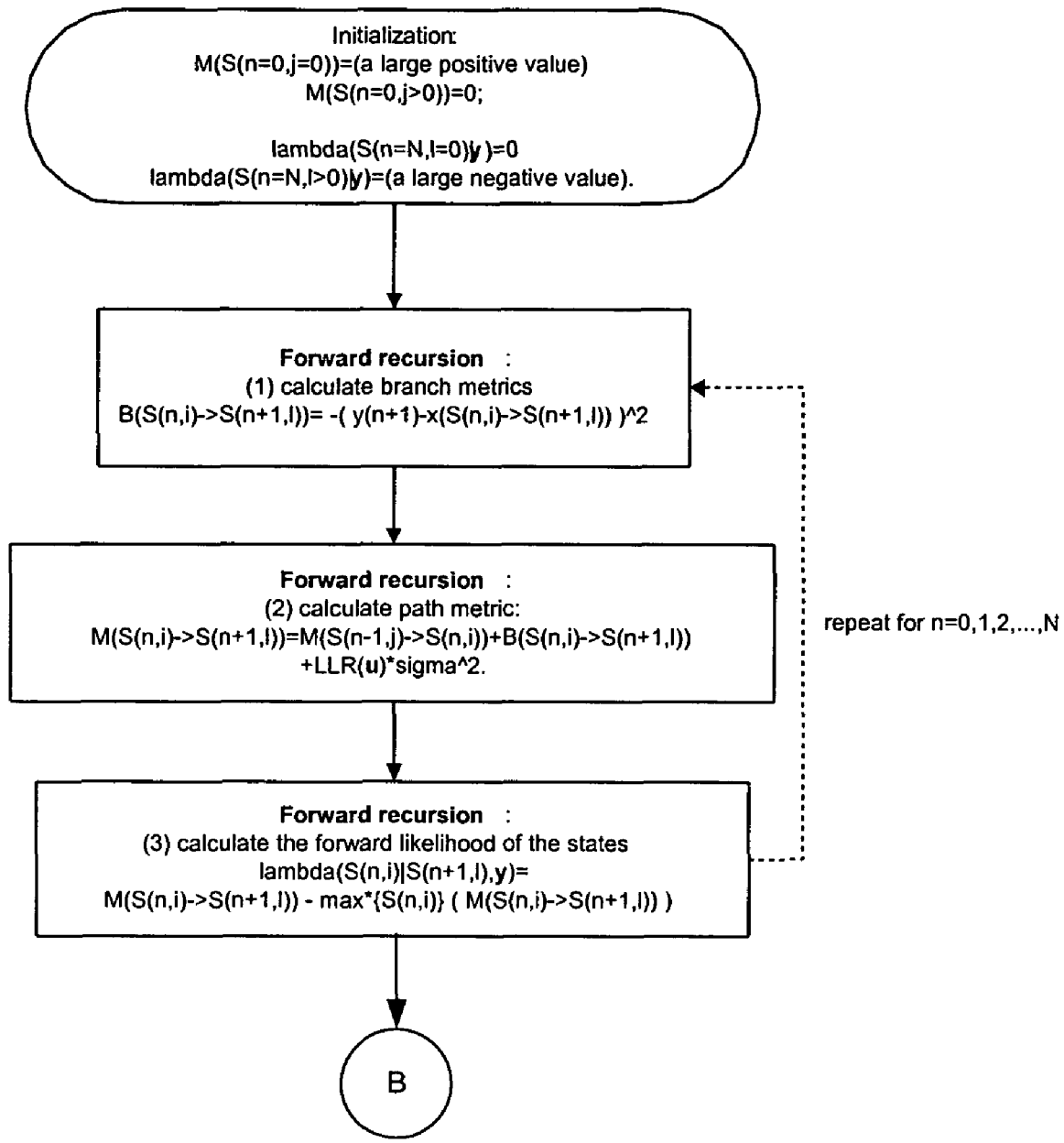
FIGS. 7A and 7B are flowcharts of an example of a process of encoding an incoming data signal according to a relatively complex encoding scheme according to another embodiment of the invention.
Figure 7B:
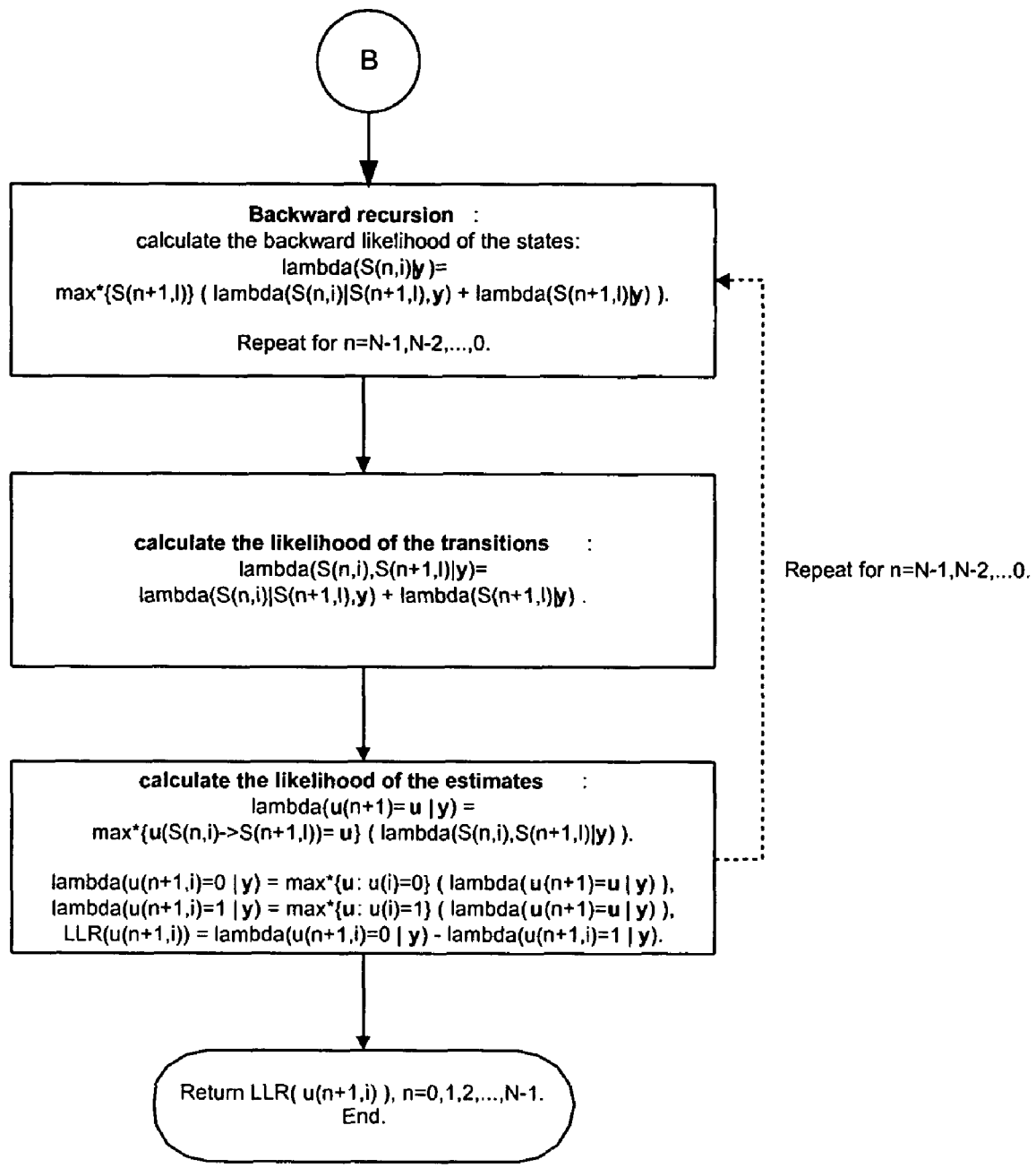

Turning now to FIGS. 7A and 7B, one approach to an SISO Viterbi scheme for TCM codes is shown in greater detail at blocks 56, 57. Specifically, let at each time index n, K information bits be encoded into N bits and then mapped into a symbol. The symbol is then transmitted over an AWGN channel.

$u_n=[u_n^1, u_n^2, \ldots, u_n^K]$—the K information bits encoded at time n. Each $u_n^i$ is a bit with a priori probability of $p(u_n^i=0)=p$. It is often assumed that $p(u_n^i=0)=p(u_n^i=1)=0.5$. Let $\lambda(u_n^i=0)=\log(p(u_n^i=0))$ and so for $\lambda(u_n^i=1)$.

$LLR(u_n^i)$—the logarithm ratio defined as $$\log\frac{p(u_n^i=0)}{p(u_n^i=1)} = \lambda(u_n^i=0) - \lambda(u_n^i=1).$$

This value is zero if $p(u_n^i=0)=p(u_n^i=1)$.

$LLR(u_n=u)$—the logarithm ratio defined as $$\log\frac{p(u_n=u)}{p(u_n=[1,1,\cdots,1])} = \lambda(u_n=u) - \lambda(u_n=[1,1,\cdots,1]).$$

This value equals $$\sum_i \lambda(u_n^i=u^i) - \sum_i \lambda(u_n^i=1)$$

if $u_n^i$ is independent of $u_n^j$ for $i \neq j$.

$x=[x_1, x_2, \ldots, x_N]$—the transmitted sequence of symbols, where $x_n$ is the symbol transmitted at time n.

$y=[y_1, y_2, \ldots, y_N]$—the received noisy sequence of symbols, where $y_n$ is the symbol received at time n.

$S_n^i$—the i th state of the trellis at time n.

$S_{n-1}^j$—one of the $2^K$ states at time n-1, which could transit to the state $S_n^i$.

$u(S_{n-1}^j \to S_n^i)$ and $x(S_{n-1}^j \to S_n^i)$—the K information bits and the symbol that are associated with the state transition $(S_{n-1}^j \to S_n^i)$.

$B(S_{n-1}^j \to S_n^i)$—the branch metric associated with the state transition $(S_{n-1}^j \to S_n^i)$, given $y_n$.

$M(S_{n-1}^j \to S_n^i)$—the path metric as a result of the state transition $(S_{n-1}^j \to S_n^i)$, given $y_n$.

$S_{n+1}^l$—one of the $2^K$ states at time n+1, to which the state $S_n^i$ could transit.

$\hat{u}_n=[\hat{u}_n^1, \hat{u}_n^2, \ldots, \hat{u}_n^K]$—the estimate of the K information bits transmitted at time n, given y. Each $\hat{u}_n^i$ is a bit.

$p(\hat{u}_n=u|y)$—the probability of $\hat{u}_n=u$ given the received sequence of y.

$\lambda(\hat{u}_n=u|y)$—it denotes $\log(p(\hat{u}_n=u|y))$.

$p(\hat{u}_n^i=u|y)$—the probability of the bit $\hat{u}_n^i=u$ given the received sequence of y.

$\lambda(\hat{u}_n^i=u|y)$—it denotes $\log(p(\hat{u}_n^i=u|y))$.

$LLR(\hat{u}_n^i)$—the logarithm likelihood ratio defined as $$\log\frac{p(\hat{u}_n^i=0|y)}{p(\hat{u}_n^i=1|y)} = \lambda(\hat{u}_n^i=0|y) - \lambda(\hat{u}_n^i=1|y).$$

This value is zero when $p(\hat{u}_n^i=0|y)=p(\hat{u}_n^i=1|y)$.

$\max^*_m(A_m)$—an operation that calculates $$\max^*_m(A_m) = \log\left(\sum_m \exp(A_m)\right),$$

which can be approximated as $\max^*_m(A_m) \approx \max_m(A_m)$.

Now, consider the derivation.

1.
$$p(\hat{u}_n=u|y) = \sum_{u(S_{n-1}^j \to S_n^i)=u} p(S_{n-1}^j, S_n^i|y),$$

where the summation is taken over all pairs of $(S_{n-1}^j, S_n^i)$ such that $u(S_{n-1}^j \to S_n^i)=u$. Its logarithm expression is $$\lambda(\hat{u}_n=u|y) = \max^*_{u(S_{n-1}^j \to S_n^i)=u} \lambda(S_{n-1}^j, S_n^i|y).$$

Finally, for every individual bit, $$LLR(\hat{u}_n^i) = \max^*_{u:u^i=0}\left(\lambda(\hat{u}_n=u|y)\right) - \max^*_{u:u^i=1}\left(\lambda(\hat{u}_n=u|y)\right).$$

2. $p(S_{n-1}^j, S_n^i|y) = p(S_{n-1}^j|S_n^i, y)p(S_n^i|y)$. Its logarithm expression is $\lambda(S_{n-1}^j, S_n^i|y) = \lambda(S_{n-1}^j|S_n^i, y) + \lambda(S_n^i|y)$.

3. Use the following relation between path metrics and $p(S_{n-1}^j|S_n^i,y)$, $$p(S_{n-1}^j \mid S_n^i, y) = \frac{\exp(M(S_{n-1}^j \to S_n^i))}{\sum_{S_{n-1}^j} \exp(M(S_{n-1}^j \to S_n^i))},$$

where the summation is taken over the $2^K$ states that could transit to $S_n^i$. The above equation can also be written as, if using logarithm expression, $$\lambda(S_{n-1}^j|S_n^i,y) = \log p(S_{n-1}^j|S_n^i,y) = M(S_{n-1}^j \to S_n^i) - \max^*_{S_{n-1}^i}(M(S_{n-1}^j \to S_n^i))$$

This step is the forward recursion part of the SISO Viterbi algorithm.

4. The other term in Step 2, $p(S_n^i|y)$, is calculated by $$p(S_n^i \mid y) = \sum_{S_{n+1}^l} p(S_n^i, S_{n+1}^l \mid y) = \sum_{S_{n+1}^l} p(S_n^i \mid S_{n+1}^l, y)\, p(S_{n+1}^l \mid y).$$

If using logarithm expression, $$\lambda(S_n^i|y) = \log p(S_n^i|y) = \max^*_{S_{n+1}^l}(\lambda(S_n^i|S_{n+1}^l,y) + \lambda(S_{n+1}^l|y))$$

This step is the backward recursion part.

5. The path metrics and branch metrics are calculated by $$M(S_n^i \to S_{n+1}^l) = M(S_{n-1}^j \to S_n^i) + \lambda(y_{n+1}|S_n^i,S_{n+1}^l),\ \lambda(u_{n+1} = u(S_n^i \to S_{n+1}^l))$$

and, if the noise in the channel is AWGN with zero mean and variance $\sigma^2$, the branch metric equals $$B(S_n^i \to S_{n+1}^l) = \lambda(y_{n+1}|S_n^i,S_{n+1}^l)\sigma^2 = -(y_{n+1} - x(S_n^i \to S_{n+1}^l))^2.$$

The path metric can be scaled by a factor and the final results will not be affected. Therefore, the path metric calculation can be re-written as $$M(S_n^i \to S_{n+1}^l) = M(S_{n-1}^j \to S_n^i) + B(y_{n+1}|S_n^i,S_{n+1}^l) + \sigma^2(\lambda(u_{n+1} = u(S_n^i \to S_{n+1}^l)) - \lambda(u_{n+1} = [1,1,\ldots,1])) + \sigma^2\lambda(u_{n+1} = [1,1,\ldots,1])$$

Since the last term of the above equation is a constant for all pairs of $(S_n^i \to S_{n+1}^l)$ and thus can be omitted, and the path metric is finally written as $$M(S_n^i \to S_{n+1}^l) = M(S_{n-1}^j \to S_n^i) + B(y_{n+1}|S_n^i,S_{n+1}^l)\ LLR(u_{n+1} = u(S_n^i \to S_{n+1}^l))\sigma^2$$

A fixed value may be given for the AWGN variance $\sigma^2$ based the expected SNR at which the SISO Viterbi decoder will be working.

6. At last the initialization before forward and backward recursion starts should be mentioned, assuming that the TCM encoder starts from state zero and ends at state zero, $$M(S_0^j) = \begin{cases} \gg 0, & j = 0 \\ 0, & j \neq 0 \end{cases}$$

so that $$p(S_0^j \mid S_1^i, y) = \begin{cases} 1, j = 0 \\ 0, j \neq 0 \end{cases} \text{ or } \lambda(S_0^j \mid S_1^i, y) = \begin{cases} 0, j = 0 \\ -\infty, j \neq 0 \end{cases},$$

and $$p(S_N^l \mid y) = \begin{cases} 1, l = 0 \\ 0, l \neq 0 \end{cases} \text{ or } \lambda(S_N^l \mid y) = \begin{cases} 0, l = 0 \\ -\infty, l \neq 0 \end{cases}.$$

Figure 5:
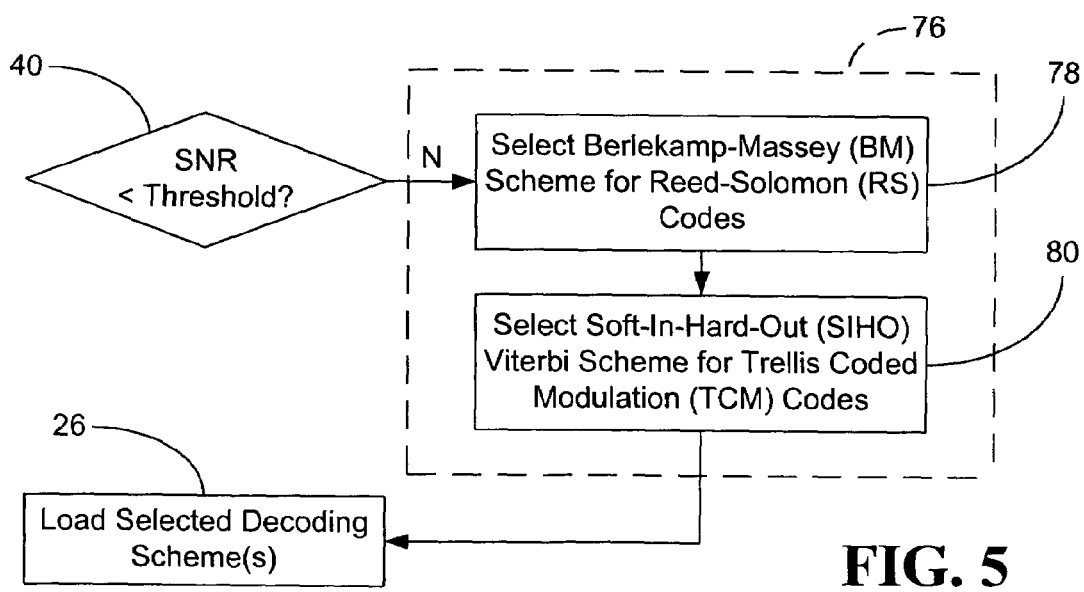
FIG. 5 is a flowchart of an example of a process of selecting relatively simple decoding schemes according to one embodiment of the invention.

FIG. 5 shows one approach to selecting a relatively simple decoding scheme in greater detail at block 76. Block 76 can therefore be substituted for processor block 46 (FIG. 3) discussed above. Specifically, a Berlekamp-Massey (BM) scheme for RS codes is selected at block 78. Block 80 provides for selecting soft-in-hard-out (SIHO) Viterbi scheme for TCM codes. The BM scheme for RS codes and SIHO Viterbi scheme for TCM codes are conventional and well documented decoding schemes. Table II below provides a million instructions per second (MIPS) comparison of different decoding algorithms for two downstream data rates.

TABLE II

| Downstream data rate | SIHO Viterbi | BM for RS | SISO Viterbi | Chase for RS |
|---|---|---|---|---|
| 13 Mbps | 246 MIPS | 54 MIPS | | |
| 400 Kbps | 69 MIPS | 1.8 MIPS | 140 MIPS | 36-180 MIPS |

Returning now to FIG. 1, it can therefore be seen that processor 12 includes a number of software implemented components such as an equalization module 60, a TCM decoder 62, de-interlever 64, an RS decoder 66, a framer 68, and an SNR monitor 70. The TCM decoder 62 can use a decoding scheme selector 72 to select between the relatively complex decoding scheme such as the SISO Viterbi scheme and a relatively simple decoding scheme such as the SIHO Viterbi scheme. Similarly, the RS decoder 66 can use selector 74 to select between a relatively complex decoding scheme such as the Chase scheme and a relatively simple decoding scheme such as the BM scheme.

The above embodiments therefore provide a unique approach to satisfying the need for a modem receiver that is programmable with regard to the encoding scheme used and does not result in operating system (OS) instability. The programmable solution enables ADSL modems to provide varying decoding complexity in order to cover short-loop (high data rate) and long-loop (low data rate) cases.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

The invention claimed is:

1. A method of operating a modem receiver, comprising:
   receiving an incoming data signal;
   selecting a decoding scheme from a plurality of decoding schemes based on a predetermined downstream data rate for the incoming data signal;
   monitoring a signal-to-noise ratio associated with one or more tones of the incoming data signal; and selecting the decoding scheme based on the signal-to-noise ratio and a signal-to-noise ratio threshold, the threshold corresponding to the predetermined downstream data rate.

2. The method of claim 1, further including selecting a relatively complex decoding scheme from the plurality of decoding schemes if the signal-to-noise ratio is less than the signal-to-noise ratio threshold.

3. The method of claim 2, wherein the relatively complex decoding scheme is a Chase scheme for Reed-Solomon codes.

4. The method of claim 2, wherein the relatively complex decoding scheme is a soft-in-soft-out Viterbi scheme for trellis coded modulation codes.

5. The method of claim 2, further including reducing a processing demand of a portion of the modem receiver based on a processing demand of the relatively complex decoding scheme.

6. The method of claim 5, further including modifying a bit-loading scheme to reduce a raw data rate of the incoming data signal.

7. The method of claim 1, further including selecting a relatively simple decoding scheme from the plurality of decoding schemes if the signal-to-noise ratio is greater than the signal-to-noise ratio threshold.

8. The method of claim 7, wherein the relatively simple decoding scheme is a Berlekamp-Massey scheme for Reed-Solomon codes.

9. The method of claim 7, wherein the relatively simple decoding scheme is a soft-in-hard-out Viterbi scheme for trellis coded modulation codes.

10. The method of claim 1, further including:
loading the selected decoding scheme into a processor memory of the modem receiver; and
decoding the incoming data signal in accordance with the selected decoding scheme to obtain the predetermined downstream data rate.

11. The method of claim 10, further including framing the incoming data signal after the decoding.

12. The method of claim 1, wherein the modem is an asymmetric digital subscriber line modem having a soft receiver architecture.

13. The method of claim 1, further including equalizing the incoming data signal in a frequency domain.

14. A method of operating an asymmetric digital subscriber line modem receiver, comprising:
receiving an incoming data signal;
equalizing the incoming data signal in a frequency domain;
selecting a first decoding scheme from a first plurality of decoding schemes based on a predetermined downstream data rate for the incoming data signal;
loading the first decoding scheme into a processor memory of the modem receiver;
decoding the incoming data signal in accordance with the first decoding scheme;
selecting a second decoding scheme from a second plurality of decoding schemes based on the predetermined downstream data rate for the incoming data signal;
loading the second decoding scheme into the processor memory;
decoding the incoming data signal in accordance with the second decoding scheme;
framing the incoming data signal;
monitoring a signal-to-noise ratio associated with one or more tones of the incoming data signal; and
selecting the first and second decoding schemes based on the signal-to-noise ratio and a signal-to-noise ratio threshold, the signal-to-noise ratio threshold corresponding to the predetermined downstream data rate.

15. The method of claim 14, further including selecting relatively complex decoding schemes from the first and second pluralities of decoding schemes if the signal-to-noise ratio is less than the signal-to-noise ratio threshold.

16. The method of claim 15, further including reducing a processing demand of a portion of the modem receiver based on processing demands of the relatively complex decoding schemes.

17. The method of claim 14, further including selecting relatively simple decoding schemes from the first and second pluralities of decoding schemes if the signal-to-noise ratio is greater than the signal-to-noise ratio threshold.

18. A machine readable storage medium comprising a stored set of instructions capable of being executed by a processor to:
receive an incoming data signal at a soft receiver architecture of a modem;
select a decoding scheme from a plurality of decoding schemes based on a predetermined downstream data rate for the incoming data signal;
monitor a signal-to-noise ratio associated with one or more tones of the incoming data signal; and
select the decoding scheme based on the signal-to-noise ratio and a signal-to-noise ratio threshold, the threshold to correspond to the predetermined downstream data rate.

19. The medium of claim 18, wherein the instructions are further capable of being executed to select a relatively complex decoding scheme from the plurality of decoding schemes if the signal-to-noise ratio is less than the signal-to-noise ratio threshold.

20. The medium of claim 19, wherein the instructions are further capable of being executed to reduce a processing demand of a portion of the modem receiver based on a processing demand of the relatively complex decoding scheme.

21. The medium of claim 18, wherein the instructions are further capable of being executed to select a relatively simple decoding scheme from the plurality of decoding schemes if the signal-to-noise ratio is greater than the signal-to-noise ratio threshold.

22. The medium of claim 18, wherein the instructions are further capable of being executed to:
load the selected decoding scheme into a processor memory of a modem receiver; and
decode the incoming data signal in accordance with the selected decoding scheme.

23. The medium of claim 19, wherein the relatively complex decoding scheme is a Chase scheme for Reed-Solomon codes.

24. The medium of claim 19, wherein the relatively complex decoding scheme is a soft-in-soft-out Viterbi scheme for trellis coded modulation codes.

25. The medium of claim 20, wherein the instructions are further capable of being executed to modifying a bit-loading scheme to reduce a raw data rate of the incoming data signal.

26. The medium of claim 21, wherein the relatively simply decoding scheme is a Berlekamp-Massey scheme for Reed-Solomon codes.

27. The medium of claim 21, wherein the relatively simple decoding scheme is a soft-in-hard-out Viterbi scheme for trellis coded modulation codes.

28. A modem system comprising:
- a transformation module to transform an incoming data signal from a time domain to a frequency domain;
- a random access memory to store set of instructions;
- a processor coupled to the transformation module and the random access memory, the processor to execute the instructions to receive the incoming data signal from the transformation module and select a decoding scheme from a plurality of decoding schemes based on a predetermined downstream data rate for the incoming data signal;
- monitor a signal-to-noise ratio associated with one or more tones of the incoming data signal; and
- select the decoding scheme based on the signal-to-noise ratio and a signal-to-noise ratio threshold, the threshold to correspond to the predetermined downstream data rate.

29. The modem system of claim 28, wherein the processor is to further execute the instructions to select a relatively complex decoding scheme from the plurality of decoding schemes if the signal-to-noise ratio is less than the signal-to-noise ratio threshold.

30. The modem system of claim 29, wherein the processor is to further execute the instructions to reduce a processing demand of a portion of the modem receiver based on a processing demand of the relatively complex decoding scheme.

31. The modem system of claim 28, wherein the processor is to further execute the instructions to select a relatively simple decoding scheme from the plurality of decoding schemes if the signal-to-noise ratio is greater than the signal-to-noise ratio threshold.

32. The modem system of claim 29, wherein the relatively complex decoding scheme is a Chase scheme for Reed-Solomon codes.

33. The modem system of claim 29, wherein the relatively complex decoding scheme is a soft-in-soft-out Viterbi scheme for trellis coded modulation codes.

34. The modem system of claim 30, wherein the processor is to further execute the instructions to modifying a bit-loading scheme to reduce a raw data rate of the incoming data signal.

35. The modem system of claim 31, wherein the relatively simple decoding scheme is a Berlekamp-Massey scheme for Reed-Solomon codes.

36. The modem system of claim 31, wherein the relatively simple decoding scheme is a soft-in-hard-out Viterbi scheme for tellis coded modulation codes.

* * * * *